US011552691B2

(12) United States Patent
Park et al.

(10) Patent No.: US 11,552,691 B2
(45) Date of Patent: Jan. 10, 2023

(54) BEAM RECOVERY GROUPING

(71) Applicant: QUALCOMM Incorporated, San Diego, CA (US)

(72) Inventors: Sungwoo Park, San Diego, CA (US); Tao Luo, San Diego, CA (US); Arumugam Chendamarai Kannan, San Diego, CA (US); Xiaoxia Zhang, San Diego, CA (US); Wooseok Nam, San Diego, CA (US); Srinivas Yerramalli, Hyderabad (IN); Zhifei Fan, San Diego, CA (US); Ahmed Abdelaziz Ibrahim Abdelaziz Zewail, San Diego, CA (US); Akula Reddy, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 17/071,596

(22) Filed: Oct. 15, 2020

(65) Prior Publication Data
US 2021/0184746 A1 Jun. 17, 2021

Related U.S. Application Data

(60) Provisional application No. 62/948,670, filed on Dec. 16, 2019.

(51) Int. Cl.
*H04B 7/06* (2006.01)
*H04W 76/19* (2018.01)
*H04W 56/00* (2009.01)
*H04L 5/00* (2006.01)

(52) U.S. Cl.
CPC .......... *H04B 7/0695* (2013.01); *H04B 7/0626* (2013.01); *H04L 5/0051* (2013.01); *H04W 56/001* (2013.01); *H04W 76/19* (2018.02)

(58) Field of Classification Search
CPC .... H04B 7/0695; H04B 7/0632; H04B 7/088; H04B 7/0626
See application file for complete search history.

(56) References Cited

U.S. PATENT DOCUMENTS

2020/0059398 A1* 2/2020 Pan ..................... H04W 72/042
2020/0099437 A1* 3/2020 Harada ............... H04W 72/046
2020/0287637 A1* 9/2020 Zhang ................. H04B 7/0695

* cited by examiner

*Primary Examiner* — Derrick V Rose
(74) *Attorney, Agent, or Firm* — Haynes and Boone, LLP

(57) ABSTRACT

A method of wireless communication, the method including: communicating, by a first wireless communication device with a second wireless communication device, communication signals using a first beam; detecting a failure of the first beam; in response to the failure of the first beam, determining that the first beam is associated with a first beam recovery group of a plurality of beam recovery groups; transmitting a beam failure recovery signal to the second wireless communication device based on determining that the first beam is associated with the first beam recovery group; and communicating, by the first wireless communication device with the second wireless communication device, the communication signals at least in part using a second beam.

30 Claims, 10 Drawing Sheets

BEAM RECOVERY GROUPING

CROSS-REFERENCE TO RELATED APPLICATIONS

The present application claims the benefit of U.S. Provisional Patent Application No. 62/948,670, filed Dec. 16, 2019, the disclosure of which is incorporated by reference herein in its entirety.

TECHNICAL FIELD

This application relates to wireless communication systems, and more particularly to beam recovery according to beam groupings in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

While high frequency bands, such as mmWave bands, can provide a higher data throughput than lower frequency bands, the path-loss can be high. To overcome the high path-loss, BSs and UEs may use beamforming to form directional beams for communications. However, beams may fail due to UE movement, channel condition changes, and the like.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, communication signals using a first beam; detecting a failure of the first beam; in response to the failure of the first beam, determining that the first beam is associated with a first beam recovery group of a plurality of beam recovery groups; transmitting a beam failure recovery signal to the second wireless communication device based on a determination that the first beam is associated with the first beam recovery group; and communicating, by the first wireless communication device with the second wireless communication device, the communication signals at least in part using a second beam.

In an additional aspect of the disclosure, a method includes transmitting a reference signal set from a base station to a user equipment, the reference signal set including information associating a first beam with a first beam recovery group and associating a second beam with a second beam recovery group; wherein the first beam recovery group is associated with a different beam recovery technique than is the second beam recovery group.

In an additional aspect of the disclosure, a method includes transmitting a reference signal set from a base station to a user equipment, the reference signal set including information associating a first beam with a first beam width characteristic and a second beam with a second beam width characteristic different from the first beam width characteristic.

In an additional aspect of the disclosure, an apparatus includes a transceiver configured to: communicating, to a first wireless communication device, communication signals using a first beam; and a processor configured to: detecting a failure of the first beam; in response to the failure of the first beam, determining that the first beam is associated with a first beam recovery group of a plurality of beam recovery groups; cause the transceiver to transmit a beam failure recovery signal to the first wireless communication device based on determining that the first beam is associated with the first beam recovery group; and cause the transceiver to communicate, with the first wireless communication device, the communication signals at least in part using a second beam.

In another aspect of the disclosure, a non-transitory computer-readable medium having program code recorded thereon, the program code includes: code for detecting a failure of a first beam, wherein the first beam is used to communicate signals by a first wireless communication device with a second wireless communication device; code for determining that the first beam is associated with a first beam recovery group of a plurality of beam recovery groups; code for causing a transceiver to transmit a beam failure recovery signal to the second wireless communication device based on determining that the first beam is associated with the first beam recovery group; and code for continuing communications between the first wireless communication device and the second wireless communication device using a second beam.

In yet another aspect of the disclosure, an apparatus includes means for detecting a failure of a first beam that is used with a second beam to communicate signals from a first wireless communication device to a second wireless communication device; means for determining that the first beam is associated with a first beam recovery group, wherein the first beam recovery group is based on a beam width characteristic; and means for transmitting a beam failure recovery signal to the second wireless communication device based on determining that the first beam is associated with the first beam recovery group.

In another aspect of the disclosure, an apparatus includes means for transmitting a reference signal set from a base station to a user equipment, the reference signal set including information associating a first beam with a first beam recovery group and associating a second beam with a second beam recovery group; wherein the first beam recovery group is associated with a different beam recovery technique than is the second beam recovery group.

In another aspect of the disclosure, an apparatus includes means for transmitting a reference signal set from a base station to a user equipment, the reference signal set including information associating a first beam with a first beam width characteristic and a second beam with a second beam width characteristic different from the first beam width characteristic.

In another aspect of the disclosure, a method of wireless communication includes: communicating, by a first wireless communication device with a second wireless communication device, communication signals using a first beam associated with a reference signal set; detecting a failure of the first beam; in response to the failure of the first beam, determining that the first beam is associated with a first beam recovery group of a plurality of beam recovery groups; and determining to not transmit a beam failure recovery signal based on the first beam being associated with the first beam recovery group and based on a second beam being active in the reference signal set.

In another aspect of the disclosure, an apparatus includes: a transceiver configured to communicate, by a first wireless communication device with a second wireless communication device, communication signals using a first beam associated with a reference signal set; and a processor configured to detect a failure of the first beam; determine that the first beam is associated with a first beam recovery group of a plurality of beam recovery groups; and determine to not transmit a beam failure recovery signal based on the first beam being associated with the first beam recovery group and based on a second beam being active in the reference signal set.

In another aspect of the disclosure, an apparatus includes: a transceiver configured to transmit a reference signal set from a base station to a user equipment, the reference signal set including information associating a first beam with a first beam recovery group and associating a second beam with a second beam recovery group, wherein the first beam recovery group is associated with a different beam recovery technique than is the second beam recovery group; and a processor configured to generate the reference signal set and send the reference signal set to the transceiver.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
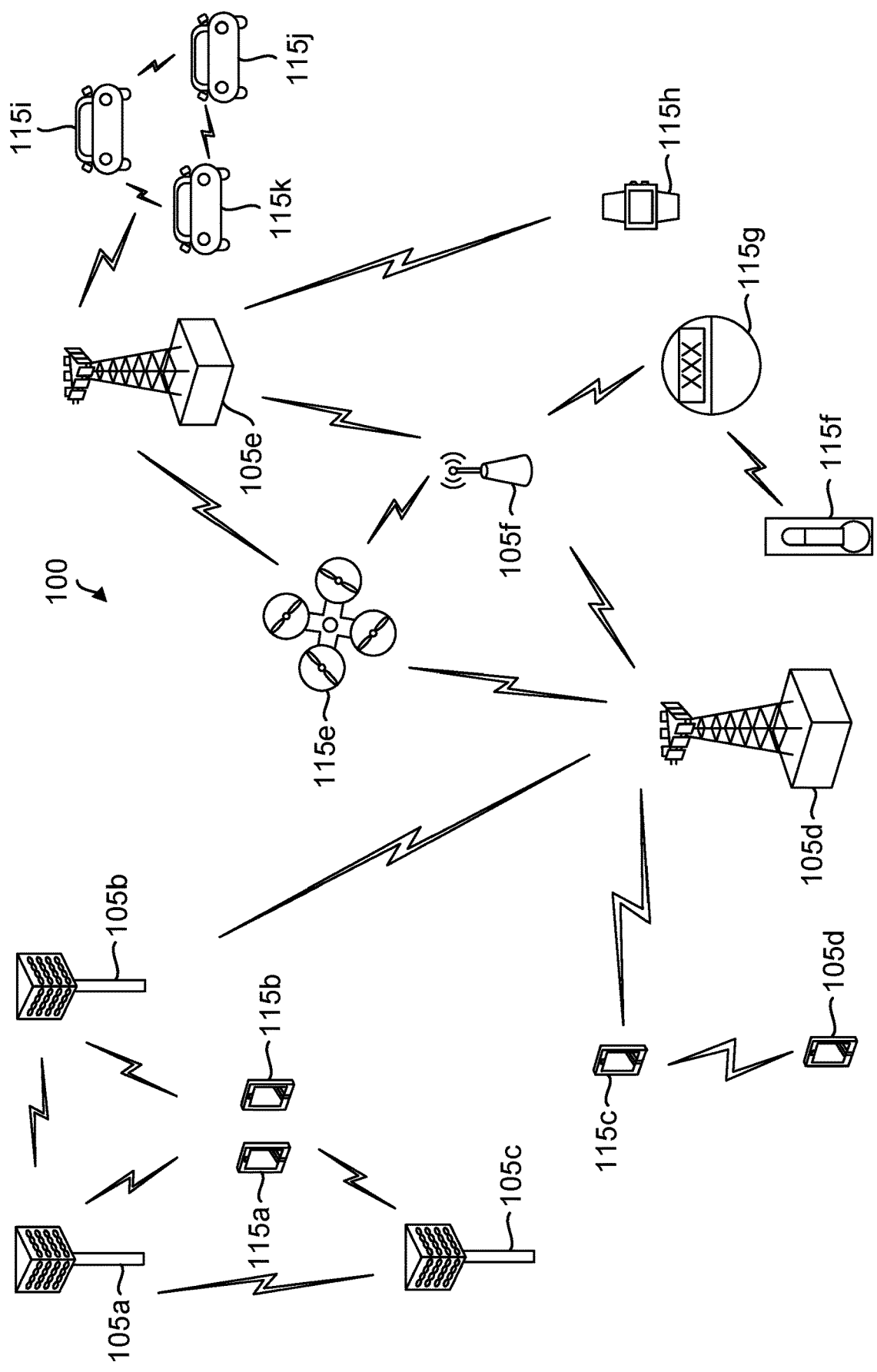
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-Advanced are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A wireless communication network may operate over a high frequency band, such as a mmWave band, to provision for a high data throughput. To overcome the high path-loss in the high frequency band, a base station (BS) may transmit reference signals and/or synchronization signal blocks (SSBs) in different beam directions, for example, by sweeping across a set of predefined beam directions. The BS may repeat the transmissions of the reference signals and/or SSBs in the different beam directions to allow a user equipment (UE) to perform signal measurements. The UE may report the measurements to the BS. The BS and the UE may select a best beam direction among the set of beam directions for subsequent communications. In some instances, the initially selected beam direction may not be optimal, or the channel condition may change, and thus the BS and the UE may perform a beam refinement procedure to refine a beam selection. For instance, the initially selected beam may have a wide beam-width for a broad coverage area and the beam refinement procedure may select a narrower beam in the initially selected direction. The narrower beam may cover a smaller geographical area but may provide a higher transmission gain. The narrow beam with the higher gain can provide a higher signal-to-noise ratio (SNR) than the wide beam. In some instances, the channel condition may degrade, and/or the UE may move out of a coverage of a currently selected beam, and thus the UE may detect a radio link failure, which may be referred to as a beam failure. Upon detecting a beam failure, the UE may perform a beam failure recovery (BFR) procedure with the BS to request for communication over a different beam direction.

Specifically, a UE may monitor for beam failure detection (BFD) to assess if a beam failure trigger condition has been met. In this example, beam failure is declared only when all serving control beams fail with, e.g., PDCCH block error ratio (BLER) as a metric. After the UE monitors the beam identification reference signal (RS) set to find a new candidate beam, the beam failure recovery request (BFRQ) is transmitted to the BS via physical random access channel (PRACH) on the selected candidate beam. This is beam failure detection and beam failure recovery (BFD/BFR). In another example, partial beam recovery may also be available. For instance, it may be possible that the subset of failed beams are switched to other candidate beams before all the serving control beams fail in order to avoid full BFD/BFR. When a UE detects a beam failure, it may send a partial beam recovery request (also called the beam switching request) to the BS via physical uplink control channel (PUCCH) on one or more of the active beams. The partial beam recovery method can reduce the number of BFD/BFR events and avoid the frequent use of RACH for BFRQ.

According to some implementations of the present disclosure, individual beams may be associated with different beam recovery groups according to beam characteristics. For instance, multiple beams may exist at the same time in an RS set and be used for communication between a UE and a BS. Some of those beams may have different characteristics than other beams. For example, some beams may be narrow beams, where other beams may be wide beams. Either the BS or the UE may determine the groupings of the beams. In any event, the beams may be grouped according to their characteristics. So, for example, the narrow beams may be grouped into a first beam recovery group, and the wide beams may be grouped into a second beam recovery group.

In some aspects, the beam recovery groups may be treated differently for beam failure purposes. In one example, the first beam recovery group may be a partial beam recovery group, and when a beam in that group fails, partial beam fail recovery may be performed by the UE. Continuing with the example, the second beam recovery group may be a BFD/BFR group in which BFD/BFR is performed in response to all beams in the RS set failing.

In one example implementation, the narrow beams are grouped into a partial beam recovery group and the wide beams are grouped into a BFD/BFR beam recovery group. Thus, when one of the narrow beams fails, the UE performs a partial beam recovery to replace that failed beam. However, if a wide beam fails, then the UE may do nothing unless that failure of the wide beam is a failure of all the beams in the RS set. Thus, if other beams in the RS set are still functional, then the UE may not perform beam recovery and, instead, give the failed beam a chance to recover itself. But if the wide beam failure leaves no beams remaining in the RS set, then the UE may perform BFD/BFR.

Aspects of the present disclosure can provide several benefits. For example, narrow beams may be more affected by UE movement and by channel conditions and thus may fail more often than wide beams. Therefore, wireless communication systems may benefit from performing a faster beam recovery for narrow beams, where partial beam recovery can be performed relatively quickly. On the other hand, wide beams may be less affected by UE movement or by channel conditions and, in some instances, may be expected to recover even without intervention. Thus, when a wide beam fails, it may be beneficial to take no immediate action because the beam may recover on its own. Also, wide beams may serve more than one UE at a given time because they may be used for random access, so recovery of a wide beam may be best performed using PRACH. PRACH may be resource-intensive and have a delay that is substantially longer than that associated with partial beam recovery. Therefore, some implementations of wireless communication systems may benefit from grouping their beams into beam recovery groups so that beams more suited for partial beam recovery may take advantage of the lower delay and less resource usage available for partial beam recovery, while still making BFD/BFR available when all beams in the RS set fail.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used. The actions of FIGS. 7-11 may be performed by any of BSs 105 and UEs 115.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., next generation—NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some aspects, the network 100 may operate over a high frequency band, for example, in a frequency range 1 (FR1) band or a frequency range 2 (FR2) band. FR1 may refer to frequencies in the sub-6 GHz range and FR2 may refer to frequencies in the mmWave range. To overcome the high path-loss at high frequency, the BSs 105 and the UEs 115 may communicate with each other using directional beams. For instance, a BS 105 may transmit SSBs by sweeping across a set of predefined beam directions and may repeat the SSB transmissions at a certain time interval in the set of beam directions to allow a UE 115 to perform initial network access. In some instances, each beam and its corresponding characteristics may be identified by a beam index. For instance, each SSB may include an indication of a beam index corresponding to the beam used for the SSB transmission. The UE 115 may determine signal measurements, such as reference signal received power (RSRP) and/or reference signal received quality (RSRQ), for the SSBs at the different beam directions and select a best DL beam. The UE 115 may indicate the selection by transmitting a PRACH signal (e.g., MSG1) using PRACH resources associated with the selected beam direction. For instance, the SSB transmitted in a particular beam direction may indicate PRACH resources that may be used by a UE 115 to communicate with the BS 105 in that particular beam direction. After selecting the best DL beam, the UE 115 may complete the random access procedure (e.g., the 4-step random access or the 2-step random access) and proceed with network registration and normal operation data exchange with the BS 105. In some instances, the initially selected beams may not be optimal or the channel condition may change, and thus the BS 105 and the UE 115 may perform a beam refinement procedure to refine a beam selection. For instance, BS 105 may transmit CSI-RSs by sweeping narrower beams over a narrower angular range and the UE 115 may report the best DL beam to the BS 105. When the BS 105 uses a narrower beam for transmission, the BS 105 may apply a higher gain, and thus may provide a better performance (e.g., a higher signal-noise-ratio (SNR)). In some instances, the channel condition may degrade and/or the UE 115 may move out of a coverage of an initially selected beam, and thus the UE 115 may detect a beam failure condition. Upon detecting a beam failure, the UE 115 may perform a BFR with the BS 105 to request for communication over a different beam direction.

In some aspects, the network 100 may be an IoT network and the UEs 115 may be IoT nodes, such as smart printers, monitors, gaming nodes, cameras, audio-video (AV) production equipment, industrial IoT devices, and/or the like. The transmission payload data size of an IoT node typically may be relatively small, for example, in the order of tens of bytes. In some aspects, the network 100 may be a massive IoT network serving tens of thousands of nodes (e.g., UEs 115) over a high frequency band, such as a FR1 band or a FR2 band.

Figure 2:
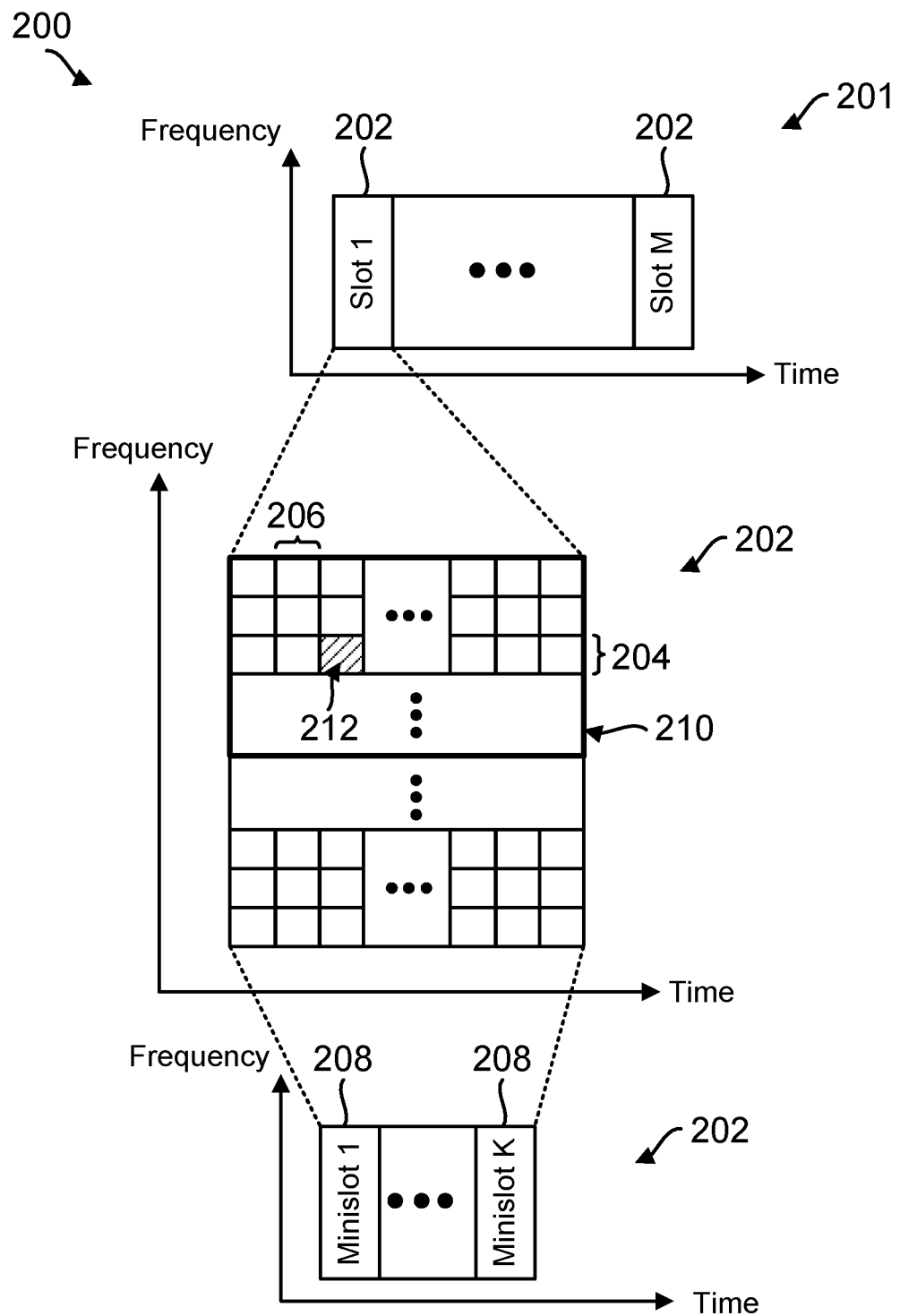
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the control plane (CP) mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
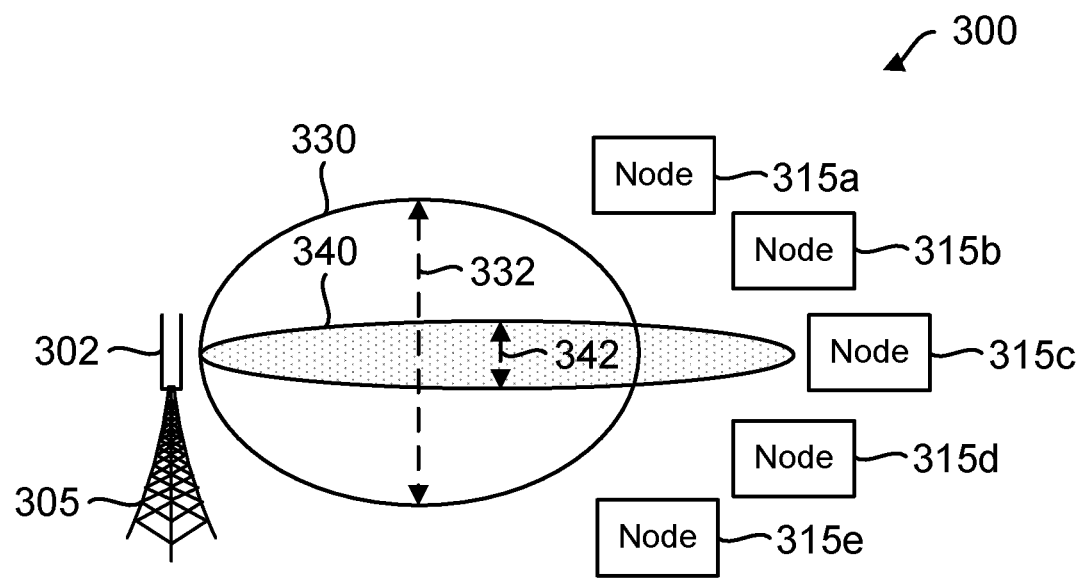
FIG. 3 illustrates a wireless communication network utilizing directional beams for communications according to some aspects of the present disclosure.

FIG. 3 illustrates a wireless communication network 300 utilizing directional beams for communications according to some aspects of the present disclosure. The network 300 may correspond to a portion of the network 100. FIG. 3 illustrates one BS 305 and five nodes 315 (shown as 315a, 315b, 315c, 315d, and 315e) for purposes of simplicity of discussion, though it will be recognized that aspects of the present disclosure may scale to many more BSs 305 and more or less nodes 315. The BS 305 may correspond to a BS 105 of the network 100 and the nodes 315 may correspond to UEs 115 of the network 100. The nodes 315 may be IoT nodes, such as smart printers, smart meters, monitors, gaming nodes, cameras, AV production equipment, industrial IoT devices, sensors, vehicles, and/or the like. The nodes 315 may collect data, measurements, statuses and report the data, measurements, and/or statuses to the BS 305. In some other instances, the nodes 315 may be customer premises equipments (CPEs). The BS 305 and the nodes 315 may communicate with each other over a sub-6 GHz band or a mmWave band using directional beams. In some instances, the BS 305 and/or the nodes 315 may use a small antenna array with a few number of antenna elements for beamforming for communication over a sub-6 GHz band, and may use a large number of antenna elements for beamforming for communication over a mmWave band. Additionally, the BS 305 and the nodes 315 may communicate with each other using the radio frame structure 200. Further, given the large bandwidth available at the high-frequency band, the BS 305 may communicate with the nodes 315 using frequency-division-multiplexing (FDM) instead of using time-division multiplexing (TDM).

In the illustrated example of FIG. 3, the nodes 315a-315e are located at geographical locations that are in close proximity to each other. The BS 305 may include an antenna array 302. The antenna array 302 may include a number of antenna elements than be configured for beamforming to create directional beams. The BS 305 may configure the antenna array 302 to create a broad coverage beam 330 to cover as many nodes as possible. A broad coverage beam 330 refers to a beam with a wide beam-width 332 that can cover a large geographical area. The beam-width 332 may refer to the width of the main lobe or main beam with a maximum radiated energy. For instance, the BS 305 may utilize the wide beam 330 to communicate with all the nodes 315a-315e. Since the antenna array 302 may deliver a limited amount of gain, a wider beam may have a lower gain (e.g., a lower peak gain) than a narrower beam. Alternatively, the BS 305 may configure the antenna array 302 to create a narrow coverage beam 340 to provide a higher gain (e.g., a higher peak gain). A narrow coverage beam 340 refers to a beam with a narrow beam-width 342 that can cover a small geographical area. For instance, the narrow beam 340 may only cover the node 315c, but may provide a higher gain to the node 315c compared to the wide beam 330. Thus, when using narrow beams for communications, the BS 305 may create a different narrow beam (in a different beam direction) for communication with each node 315. In other words, in order to use narrow beams for the high gain, the BS 305 may communicate with each node 315 at a different time using different beams rather than communicating with all nodes 315a-315e at the same time using FDM with a wide beam. As such, there is a trade-off between transmission gain and beam-width or coverage in order to take advantage of the large bandwidth.

Figure 4:
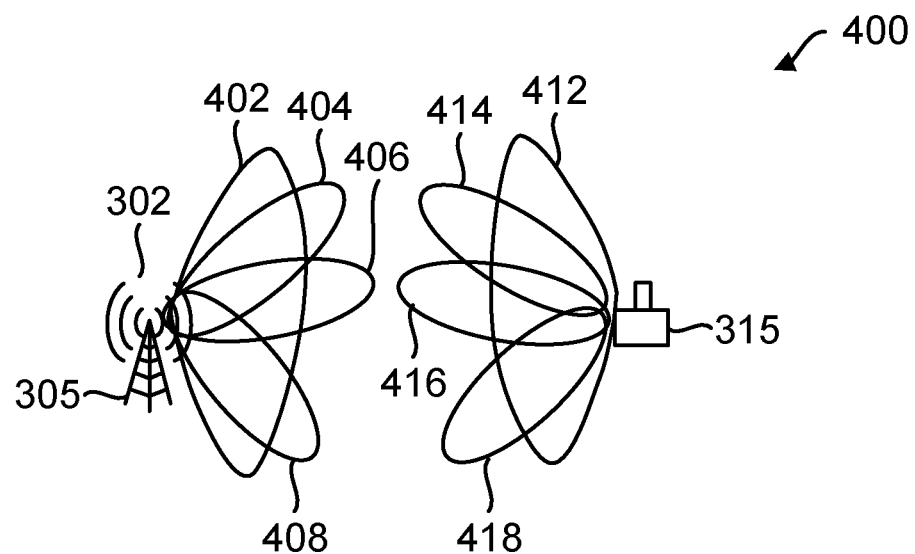
FIG. 4 illustrates a wireless communication scenario with directional beams according to some aspects of the present disclosure.

FIG. 4 illustrates a wireless communication network 400 utilizing directional beams for communications according to some aspects of the present disclosure. FIG. 4 illustrates that a given system may use multiple beams simultaneously for communicating control signals. For instance, in this example BS 305 communicates with node 315 using multiple beams 402, 404, 406, 408. Beam 402 in this example is a wide beam, whereas beams 404-408 are narrow beams. Also, beams 412, 414, 416, 418 are illustrations of the beams 402-408, respectively, as they appear at the UE. While the example of FIG. 4 shows four beams simultaneously, it is understood that various implementations may use any number of suitable beams. Furthermore, while only one wide beam—402, 412—is shown, it is understood that other implementations may use multiple wide beams simultaneously. And, other implementations may use only a single narrow beam at a given time. In other words, any number of beams suitable for a given time and a given application may be used in various implementations.

As noted above, beams may fail. In this example, the narrow beams 404-408, 414-418 may be assigned to a partial beam recovery group, and the wide beam 402, 412 may be assigned to a non-partial beam recovery group. Thus, in an instance in which beam 404, 414 fails, then node 315 may transmit a partial beam recovery request to the BS 305 via PUCCH on another of the active beams, such as any of 406, 416 or 408, 418. BS 305 may then transmit a recovered RS set that includes an additional narrow beam (not shown). In an instance in which beam 402, 412 fails, but any of beams 404-408, 414-418 are still active, then node 315 may do nothing. However, if all beams in the RS set (402-408, 412-418) fail, then node 315 may perform BFR/BFD, which may include sending a beam failure recovery request via PRACH on a selected candidate beam (not shown). BS 305 may then transmit a recovered RS set that includes a replacement wide beam (not shown) corresponding to the candidate beam. This process is described in more detail with respect to FIGS. 7-11.

Figure 5:
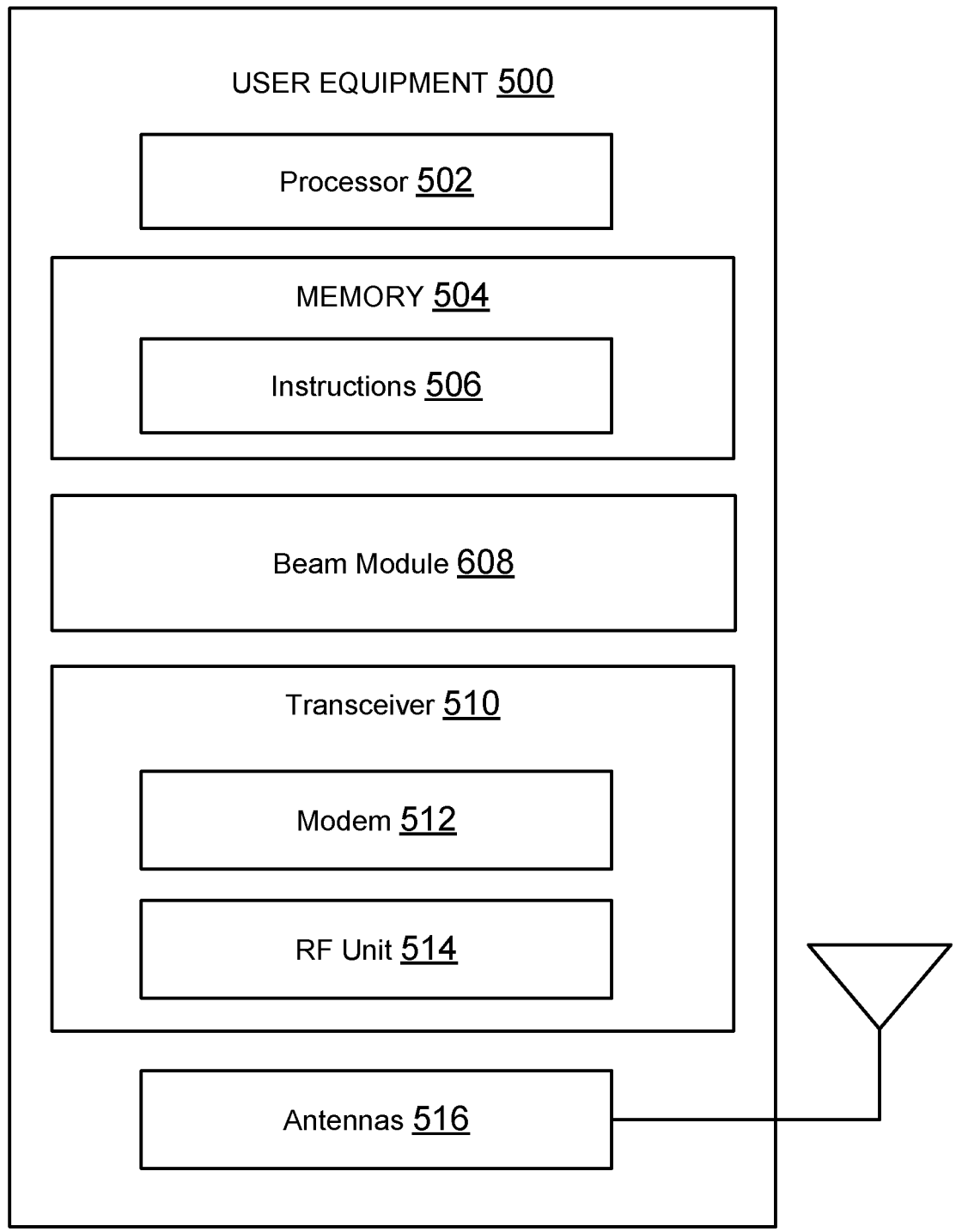
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1 or a node 315 discussed above in FIGS. 3 and 4. As shown, the UE 500 may include a processor 502, a memory 504, a beam module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 2-4 and 7-10. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The beam module 508 may be implemented via hardware, software, or combinations thereof. For example, the beam module 508 may be implemented as a processor, circuit, and/or instructions 506 stored in the memory 504 and executed by the processor 502. In some instances, the beam module 508 can be integrated within the modem subsystem 512. For example, the beam module 508 can be implemented by a combination of software components (e.g., executed by a DSP or a general processor) and hardware components (e.g., logic gates and circuitry) within the modem subsystem 512.

The beam module 508 may be used for various aspects of the present disclosure, for example, aspects of aspects of FIGS. 7-11. The beam module 508 is configured to receive SSBs from a BS (e.g., the BSs 105 and/or 305) in various beams directions, receive a CSI-RS resource configuration from the BS, receive a BFR resource configuration from the BS, receive CSI-RSs from various beam directions based in the CSI-RS resource configuration, determine beam measurements (e.g., RSRPs and/or RSRQs) for the received SSBs and/or CSI-RSs, report beam feedback information (e.g., including the measurements) to the BS, perform beam selection with the BS to select an optimal beam for communication with the BS, monitor beam measurements, request beam refinement, and/or request BFR when beam measurements fall below certain thresholds, receive a beam switch command from the BS, and/or perform a beam switch based on a beam switch command. In some aspects, beam module 508 is configured to configure the transceiver 510 to perform digital beamforming and/or analog beamforming to generate reception beams in certain directions for receiving DL signals from the BS and/or to generate transmission beams in certain directions for transmitting UL signals to the BS.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the beam module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PUCCH control information, PRACH signals, PUSCH data, beam refinement request, BFR request, beam switch command, reference signals) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., SSBs, PDCCH, PDSCH, beam switch command, CSI-RS resource configuration, CSI-RS reporting configuration, BFR resource configuration) to the beam module 508 for processing. The antennas 516 may include multiple antennas of similar or different designs in order to sustain multiple transmission links. The RF unit 514 may configure the antennas 516.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
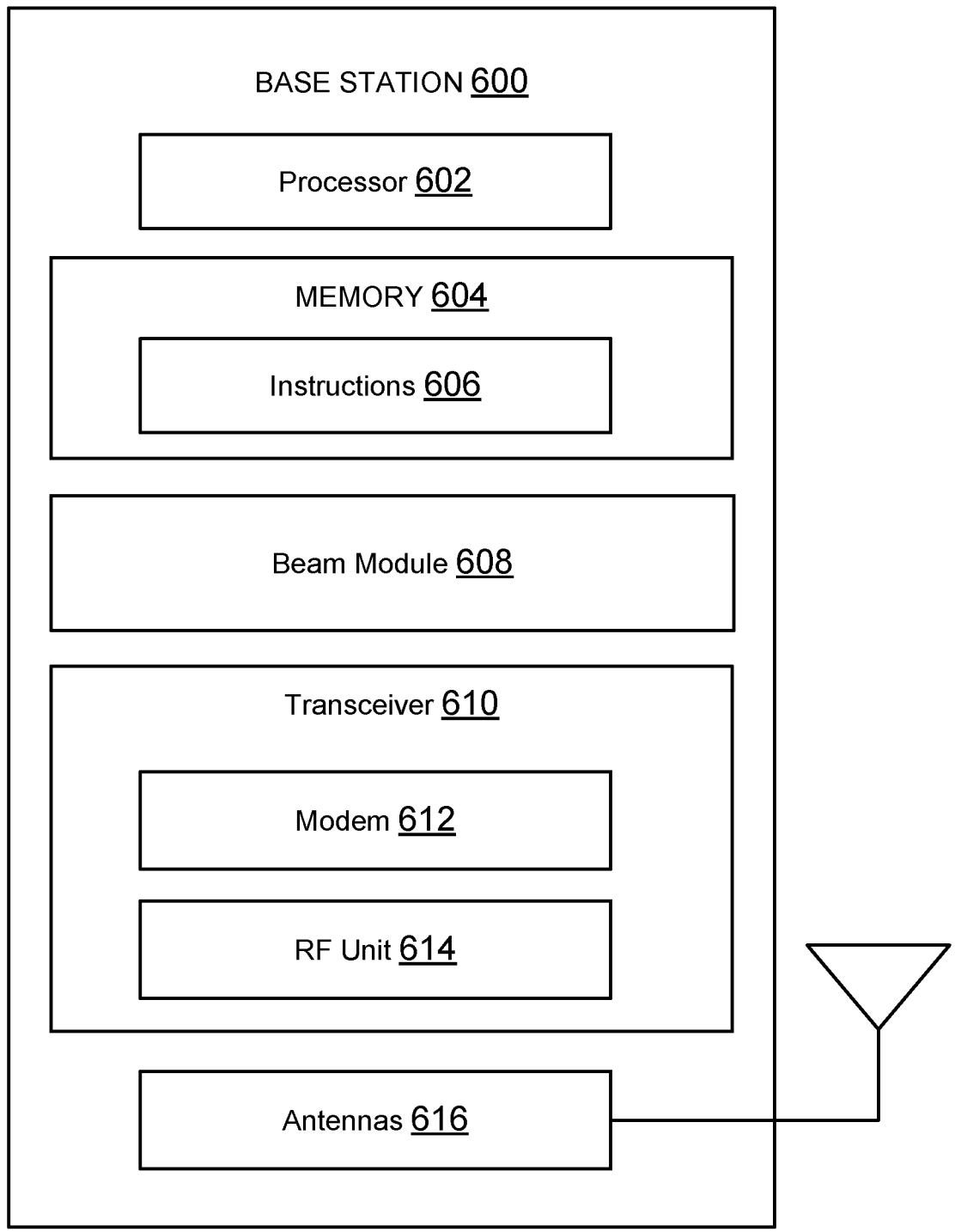
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1 or a node 315 discussed above in FIGS. 3 and 4. A shown, the BS 600 may include a processor 602, a memory 604, a beam module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 2-4 and 7-10. Instructions 606 may also be referred to as code, which may be interpreted broadly to include any type of computer-readable statement(s) as discussed above with respect to FIG. 5.

The beam module 608 may be implemented via hardware, software, or combinations thereof. For example, the beam module 608 may be implemented as a processor, circuit, and/or instructions 606 stored in the memory 604 and executed by the processor 602. In some instances, the beam module 608 can be integrated within the modem subsystem 612. For example, the beam module 608 can be implemented by a combination of software components (e.g., executed by a DSP or a general processor) and hardware components (e.g., logic gates and circuitry) within the modem subsystem 612.

The beam module 608 may be used for various aspects of the present disclosure, for example, aspects of aspects of FIGS. 7-11 for beam recovery.

As shown, the transceiver 610 may include the modem subsystem 612 and the RF unit 614. The transceiver 610 can be configured to communicate bi-directionally with other devices, such as the UEs 115 and/or 300 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., SSBs, RMSI, MIB, system information block—SIB, frame based equipment—FBE configuration, PRACH configuration PDCCH, PDSCH) from the modem subsystem 612 (on outbound transmissions) or of transmissions originating from another source such as a UE 115, the node 315, and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may be similar to the antenna array 302 of the BS 305 discussed above. This may include, for example, transmission of information to complete attachment to a network and communication with a camped UE 115 or 215 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., PUCCH control information, PRACH signals, PUSCH data) to the beam module 608 for processing. The antennas 616 may include multiple antennas of similar or different designs in order to sustain multiple transmission links.

In an example, the transceiver 610 is configured to transmit, to a UE, system information including an FBE configuration indicating a plurality of frame periods, each including a gap period for contention at the beginning of the frame period, and communicate with the UE based on the FBE configuration, for example, by coordinating with the beam module 608.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
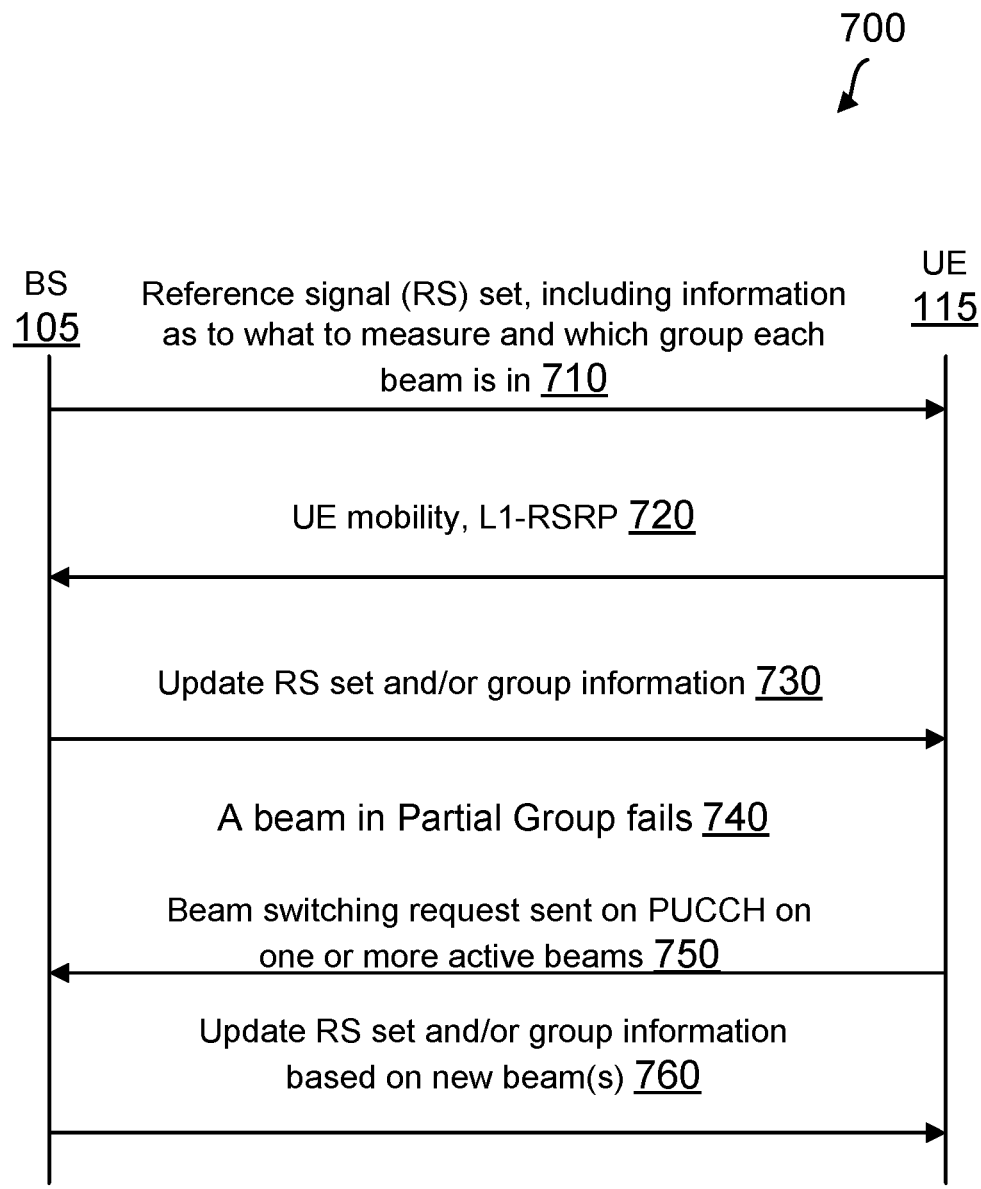
FIG. 7 is a signaling diagram according to some aspects of the present disclosure.

FIG. 7 is a signaling diagram of a beam recovery method 700 according to some aspects of the present disclosure. The method 700 may be implemented between any BS 105 and any UE 115 in the network 100 (shown in FIG. 1). For instance, the BS 105 may utilize one or more components, such as the processor 602, the memory 604, the beam module 608, the transceiver 610, and the one or more antennas 616, to execute the steps of method 700. Similarly, the UE 115 may utilize one or more components, such as the processor 502, the memory 504, the beam module 508, the transceiver 510, and the one or more antennas 516, to execute the steps of method 700. As illustrated, the method 700 includes a number of enumerated steps, but implementations of the method 700 may include additional steps before, after, and in between the enumerated steps. In some aspects, one or more of the enumerated steps may be omitted or performed in a different order.

At action 710, BS 105 sends an RS set to the UE 115. Action 710 may include BS 105 identifying each of the signals in the RS set by RS indexes, where a given RS index identifies a reference signal corresponding to a beam. In some instances, the information set with the RS set may include instructions to UE 115 as to what to measure, e.g., CSI, SSB, and the like.

In the example of beam recovery method 700, BS 105 has already determined beam recovery groupings for the different beams, and action 710 may include BS 105 sending information as to which group each beam belongs. An example may be seen in FIG. 4, having multiple beams. Continuing with the example, and with reference to FIG. 4, wide beam 402, 412 may be placed in a non-partial beam recovery group, whereas the other narrow beams 404-408, 414-418 may be placed in a partial beam recovery group.

Referring again to action 710, it may include sending information from BS 105 to UE 115 indicating which of the groups the beams belong to. For instance, the RS indexes may be used, where a reference signal corresponding to a particular beam may be associated with an index having either a zero bit or a one bit appended, and the zero or one indicates a respective beam recovery group. The beam recovery groupings may be based on beam characteristics, such as beam width, bandwidth, and/or the like. In one example, narrow beams are associated with a partial beam recovery group, and wide beams are associated with a non-partial beam recovery group.

Furthermore, the information indicating which group each beam belongs to may be sent at any appropriate time and using any appropriate signal. For instance, the information may be sent from BS 105 to UE 115 via RRC, MAC Control element (MAC-CE), DCI, or the like.

At action 720, UE 115 sends information to BS 105 to maintain connectivity. For instance, UE 115 may send UE mobility information to the BS 105 and/or may send layer 1 (L1)-RSRP information to identify received signal power. Such information may be used by BS 105 to determine whether the RS set is still appropriate, as movement of the UE or channel condition changes, as indicated by L1-RSRP, may render some of the beams unusable. Accordingly, action 730 may include BS 105 updating the RS set and sending an updated RS set to UE 115. The format of the signal sent at action 730 may be the same as or similar to the format of the signal sent at action 710.

At action 740, a beam in the partial beam recovery group fails. For example, beam failure may include UE 115 detecting that RSRP falls below a certain threshold, though the scope of implementations is not limited to any particular technique to determine beam failure. UE 115 is aware of the beam recovery groupings, which it received from BS 105 at action 710 and which it may store in volatile or nonvolatile memory. UE 115 checks its memory to determine which group is associated with the failed beam. In this example, UE 115 determines that the failed beam belongs to the partial beam recovery group.

At action 750, in response to determining that the failed beam belongs in the partial beam recovery group, the UE 115 sends a beam switching request on one or more active beams to base station 105. For instance, the UE 115 may send the beam switching request on uplink channel dedicated to UE 115, such as by using PUCCH. UE 115 may choose any of the other active beams, such as another narrow beam or a wide beam.

At action 760, the BS 105 updates the RS set accordingly and/or the beam recovery group information based on deletion of the failed beam and addition of a new beam. BS 105 sends the updated RS set to UE 115 with a signal format being the same as or similar to that described above with respect to action 710. Note that if the beam that had failed at action 740 was, instead, a beam in the non-partial beam recovery group, UE 115 would not have performed beam recovery so long as other active beams remain in the RS set.

Figure 8:
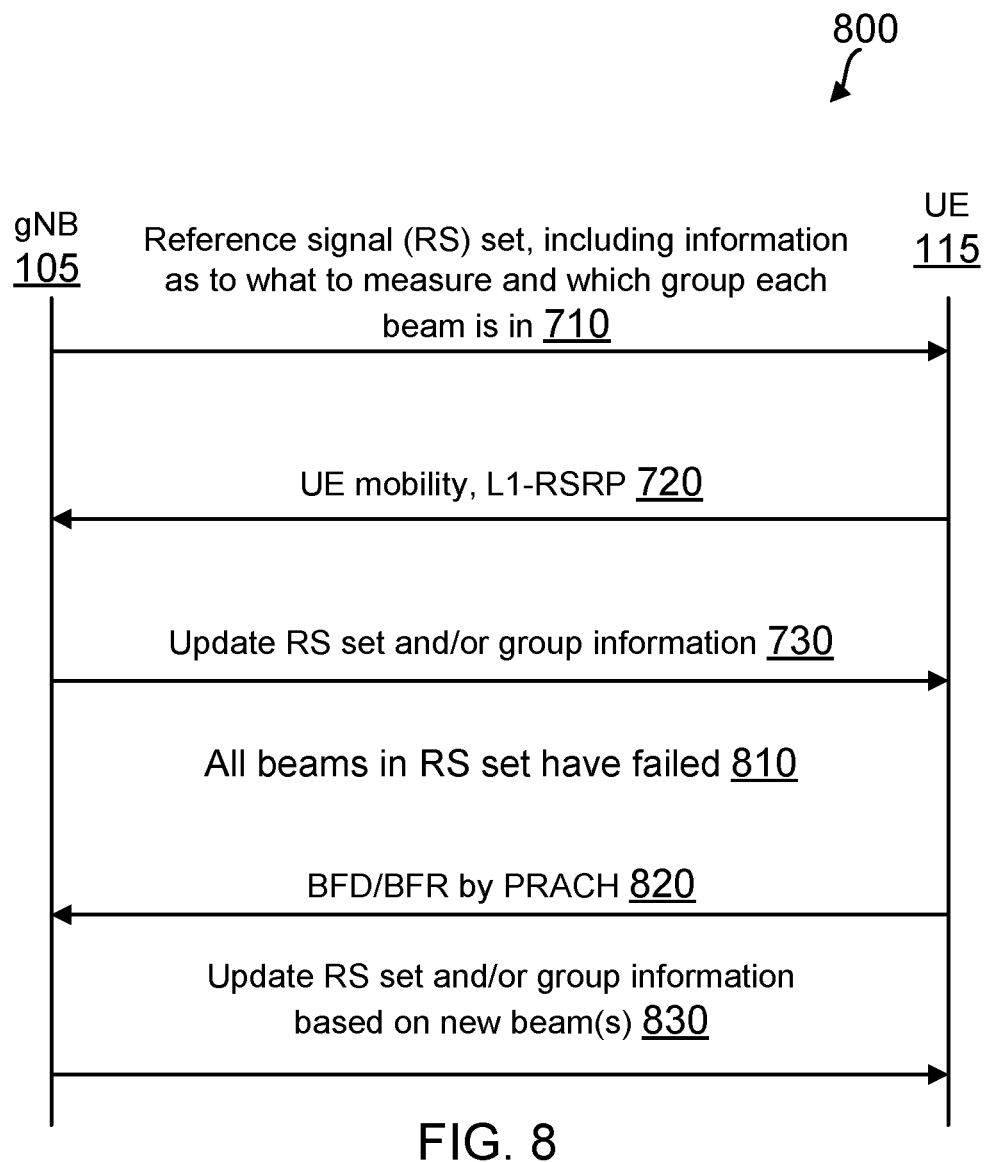
FIG. 8 is a signaling diagram according to some aspects of the present disclosure.

FIG. 8 is a signaling diagram similar to FIG. 7. However, in example method 800 of FIG. 8, all of the beams in the RS set have failed. Action 710-730 are the same as those described above with respect to FIG. 7.

At action 810, the last (or only) beam in the RS set fails. Once again, beam failure may be determined using any suitable metric, such as RSRP falling below a particular threshold.

In response to determining that the beam has failed, UE 115 checks whether other beams in the RS set are still active. If other beams in the RS set are active, then UE 115 may perform no intervention in accordance with BFD/BFR. On the other hand, if the beam failure results in no active beams within the RS set, then UE 115 may monitor the RS set for one or more candidate beams and send a beam failure recovery request via PRACH on the one or more candidate beams.

At action 830, the BS 105 updates the RS set accordingly and/or the beam recovery group information based on deletion of the failed beam and addition of a new beam or beams. BS 105 sends the updated RS set to UE 115 with a signal format being the same as or similar to that described above with respect to action 710.

In the examples of FIGS. 7 and 8, the BS 105 determined the grouping of the control beams and sent information including those groupings to the UE 115. By contrast, the examples of FIGS. 9 and 10 describe implementations in which the UE 115 determines the groupings of the control beams.

Action 910, BS 105 sends an RS set to UE 115. In this example, action 910 may be similar to action 710, except that the signal in action 910 does not include an indication of beam grouping. Rather, BS 105 may or may not send an indication of beam width or other beam characteristic.

In one example, the signal in action 910 may include indications of beam characteristics, such as whether particular beams are narrow or wide. UE 115 may use this information to group the beams into beam recovery groups. In another example, UE 115 may infer beam characteristics based on instructions from BS 105 as to what to measure. For instance, if BS 105 instructs UE 115 to measure CSI for a particular reference signal that corresponds to a particular beam, then UE 115 may infer that the beam is a narrow beam. This is because narrow beams are usually, but not always, associated with a CSI measurement. On the other hand, if BS 105 instructs UE 115 to measure SSB for a particular reference signal that corresponds to a particular beam, then UE 115 may infer that the beam is a wide beam. This is because wide beams are usually, though not always, associated with an SSB measurement.

In any event, whether UE 115 receives direct information regarding beam characteristics or infers those beam characteristics, UE 115 uses those beam characteristics to group beams into two or more beam recovery groups at action 920. Any appropriate beam recovery groups may be used, and in the examples above, narrow beams are assigned to a partial beam recovery group, and wide beams are assigned to a non-partial beam recovery group. The UE 115 may then save data indicating the groupings to volatile or nonvolatile memory.

Action 930 is the same as or similar to action 720, in which UE 115 provides UE mobility and L1-RSRP information to BS 105. In response, BS 105 may update the RS set and or beam attributes accordingly at action 940. For instance, BS 105 may increase a number of beams, decrease a number of beams, or replace beams showing low channel quality as appropriate and then update the RS set to include the changes made.

At action 950, a beam in the partial beam recovery group fails, which is detected by the UE 115. Action 950 may be substantially the same or similar to action 740 of FIG. 7. UE 115 then sends a beam switching request to BS 105 by a dedicated uplink channel, such as by PUCCH, as in action 750.

BS 105 responds to the beam switching request by performing beam replacement, such as replacing the failed beam with another active beam and then updating the RS set and any other information at action 970. The information sent in the signal at action 970 may include the same or similar format as action 910. Once again, if the beam that had failed at action 950 was, instead, a beam in the non-partial beam recovery group, UE 115 would not have performed beam recovery so long as other active beams remain in the RS set.

Figure 9:
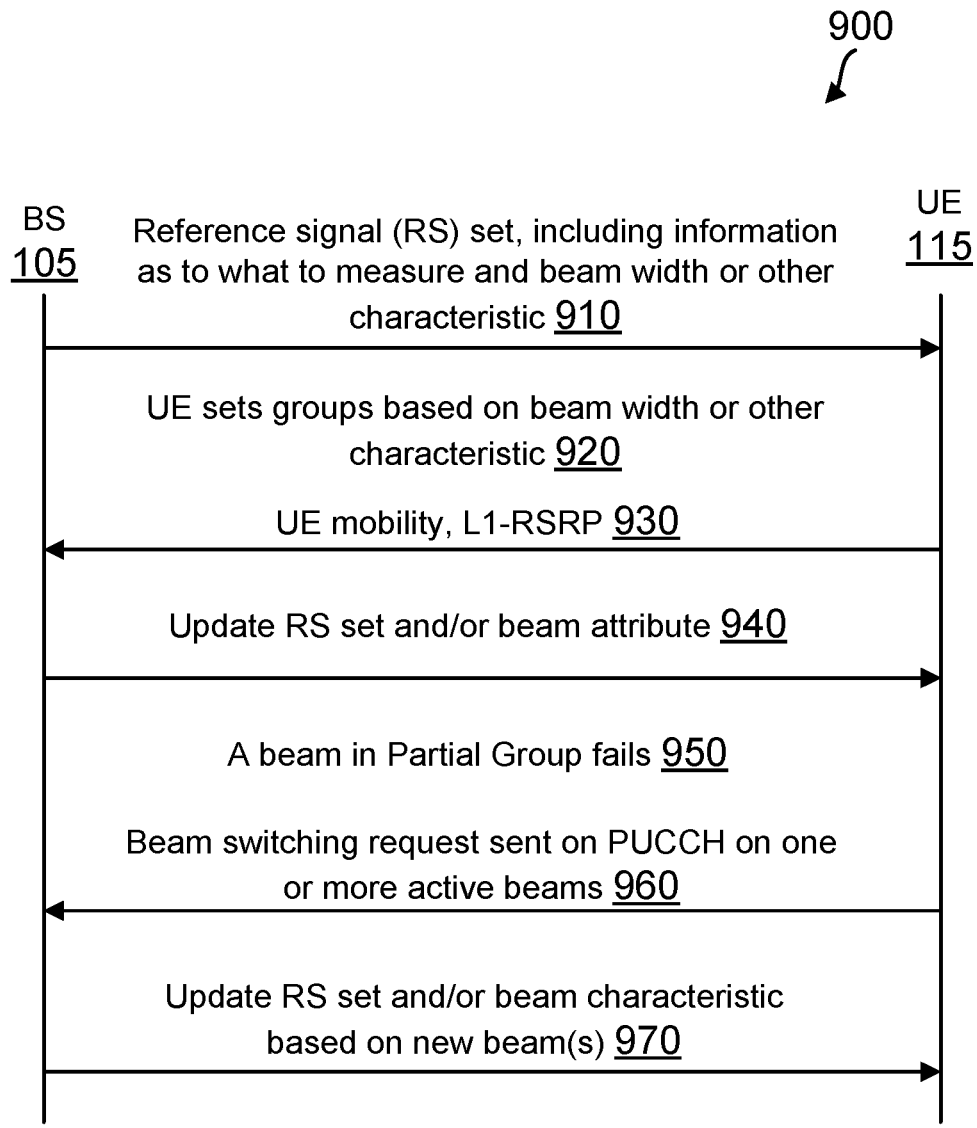
FIG. 9 is a signaling diagram according to some aspects of the present disclosure.
Figure 10:
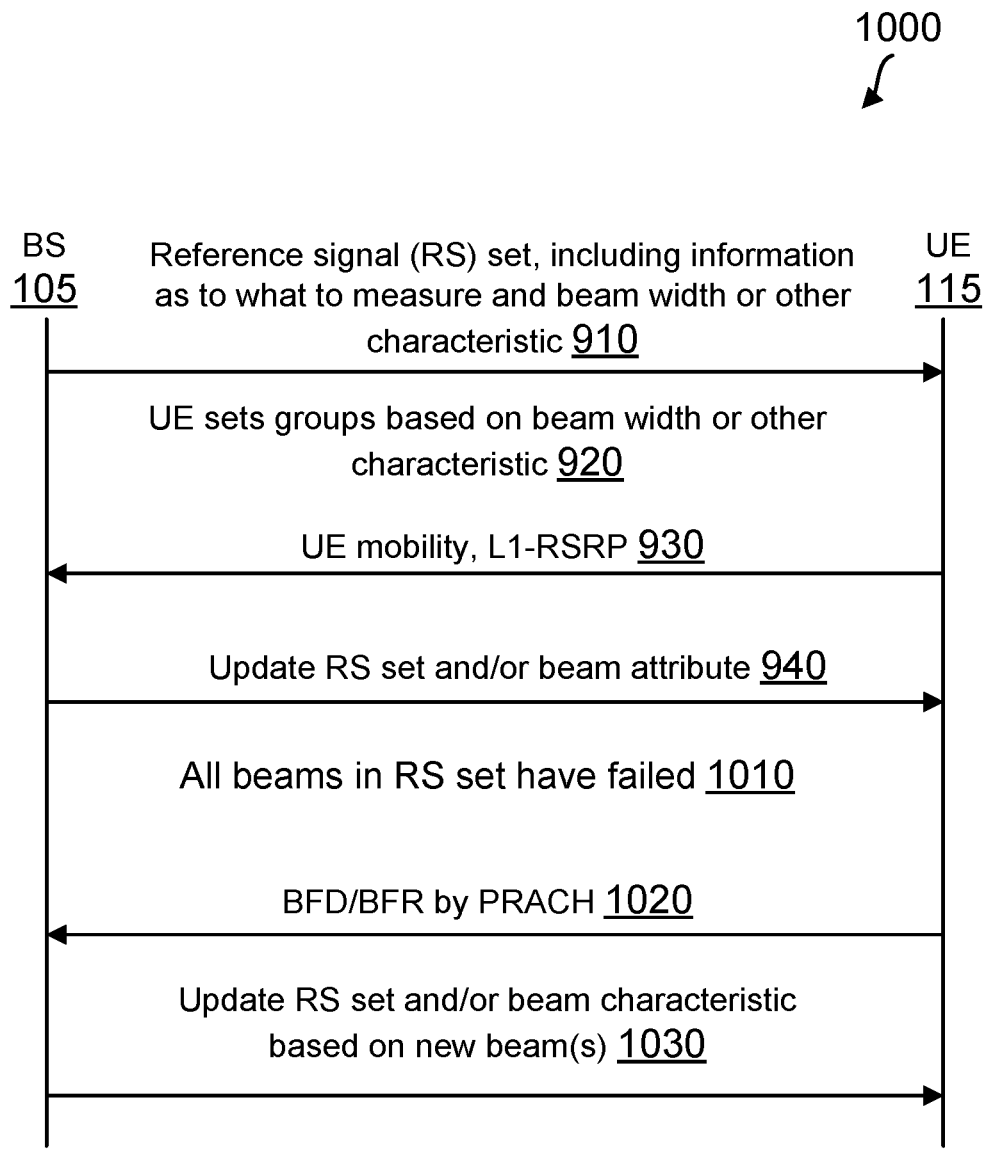
FIG. 10 is a signaling diagram according to some aspects of the present disclosure.

FIG. 10 illustrates example method 1000, which is similar to method 900 of FIG. 9, except in the example of method 1000, the last remaining (or only) beam in the RS set has failed.

At action 1010, UE 115 detects that the beam failure has resulted in no active beams in the RS set. Upon determining that no active beams remain, UE 115 then performs BFD/BFR at action 1020, which is substantially the same as or similar to action 820. For instance, if the failed beam leaves behind no active beams in that non-partial beam recovery group, then UE 115 may monitor the RS set to select one or more candidate beams and then send a beam failure recovery quest to BS 105 using those one or more candidate beams. In response, the BS 105 may then assign the one or more candidate beams to the RS and update the RS accordingly at action 1030.

In each of the example methods 700-1000, after a failed beam is replaced by a new beam or beams in the RS set, BS 105 and UE 115 continue wireless communications using the replacement beam and, if available, the other active beams. The scope of implementations is not limited to the particular actions shown in the signal diagrams of FIGS. 7-10, as some implementations may add, omit, rearrange, or modify some of the actions. For instance, the systems of FIGS. 1 and 4 may continue to perform the actions of methods 700-1000 repeatedly as new connections are made or existing connections are torn down. For instance, as UE 115 moves from physical location to physical location, it may cause some beams to fail and be replaced by other beams. Also, as other UEs begin communicating with BS 105 or stop communicating with BS 105, beams may be set up or torn down as appropriate.

Also, it is noted that in some instances some beam recovery groups may have no entries. For instance, it may be possible that all of the beams in an RS set may be either narrow beams or wide beams and, thus, may be assigned to a same beam recovery group. In such examples, partial beam recovery may be applied to each of the beams within an RS set or to none of the beams within an RS set.

Also, while the examples herein refer to a single BS, the scope of implementations is not so limited. Rather, in some implementations UE 115 may communicate with multiple BSs, and each BS may assign its own RS set, or the multiple BSs may share an RS set with the UE 115. In other words, the concepts described herein may be applied to a multi-TRP (transmit receive point) case.

Figure 11:
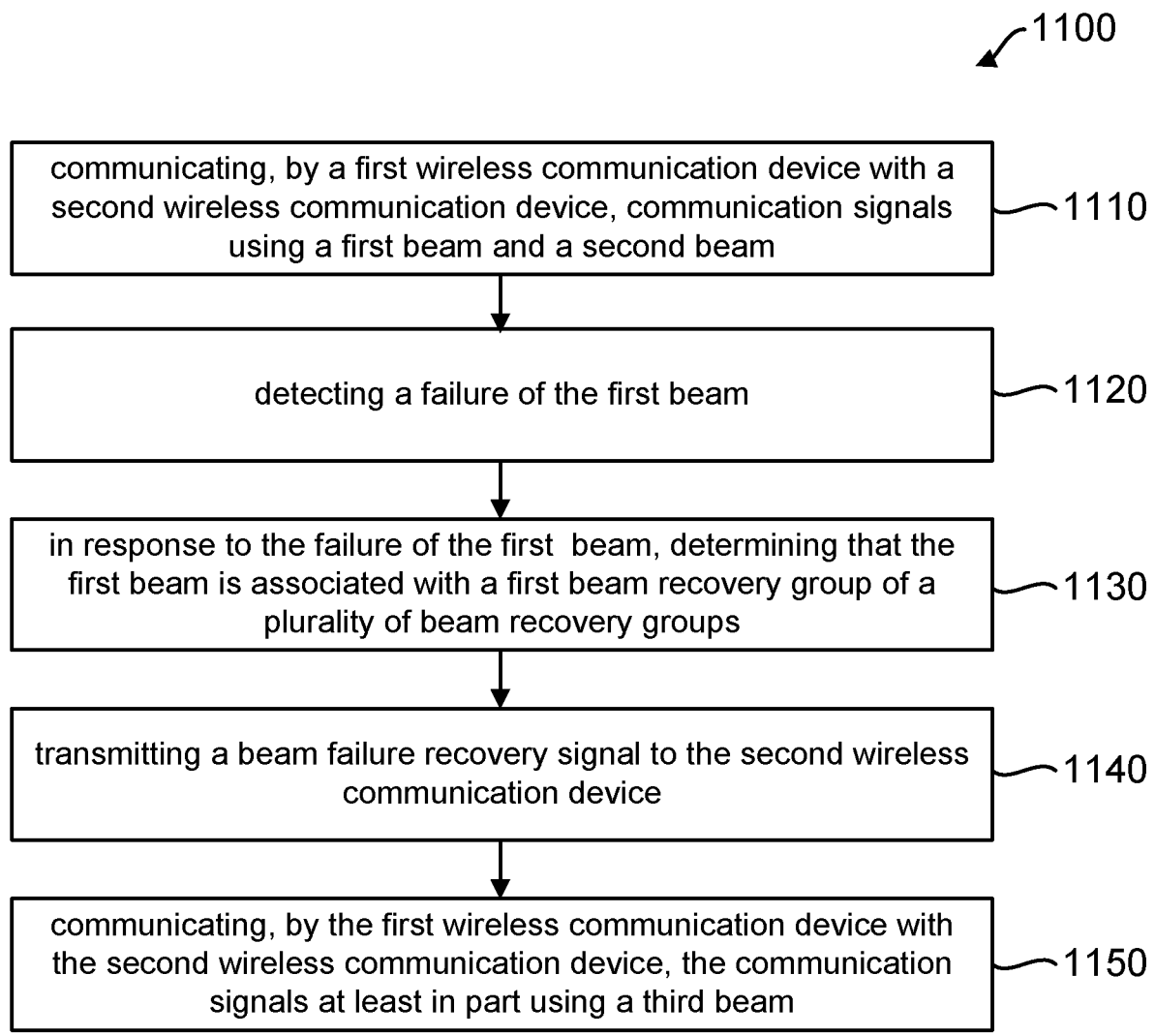
FIG. 11 is a flow diagram of a communication method according to some aspects of the present disclosure.

FIG. 11 is a flow diagram of a communication method 1100 according to some aspects of the present disclosure. Actions of the method 1100 can be executed by a computing device (e.g., a processor, processing circuit, and/or other suitable component) of an apparatus or other suitable means for performing the steps. For example, a UE, such as any of the UEs 115, nodes 315, and/or the UE 500, may utilize one or more components, such as the processor 502, the memory 504, the beam module 508, the transceiver 510, and the one or more antennas 516, to execute the steps of method 1100.

The method 1100 may employ similar mechanisms as in the methods 700-1000 described above with respect to FIGS. 7-10, respectively. As illustrated, the method 1100 includes a number of enumerated actions, but aspects of the method 1100 may include additional steps before, after, and in between the enumerated actions. In some aspects, one or more of the enumerated actions may be omitted or performed in a different order.

Method 1100 assumes that beam recovery groups are set. The beam recovery groups may be determined by the BS, as in example methods 700 and 800 of FIGS. 7 and 8, where the UE receives a RS set that includes information associating the beams with the respective beam recovery groups. Alternatively, the beam recovery groups may be determined by the UE. For example, the UE may receive an indication from the BS that some beams have a first characteristic (e.g., are narrow) and other beams have a second characteristic (e.g., are wide) when the RS set is sent. The UE may use that information to group the beams. In another implementation, the UE receives a reference signal set that includes instructions to measure characteristics of the beams (e.g., CSI, SSB, and the like), and the UE may associate the beams with beam recovery groups based on those instructions to measure the characteristics. Examples of beam recovery groups may include partial beam recovery groups and non-partial beam recovery groups.

At block 1110, a first wireless communication device communicates, with a second wireless communication device of a group of wireless communication devices, a communication signal. In some instances, the first wireless communication device may utilize one or more components, such as a processor (e.g., the processor 502), a memory (e.g., the memory 504), a beam module (e.g., the beam module 508), a transceiver (e.g., the transceiver 510), and one or more antennas (e.g., the antennas 516), to communicate the communication signal. The first wireless communication device may perform digital beamforming and/or analog beamforming at the transceiver to generate a beam with the first beam characteristic for the communication.

In some other aspects, the first wireless communication device may correspond to a UE (e.g., the UEs 115, 213, and/or 500). In some aspects, the second wireless communication device may correspond to a BS (e.g., the BSs 105, 305, and/or 600).

At block 1120, the first wireless communication device detects a failure of the first beam. For instance, the first wireless communication device may detect that a RSRP or other metric has dropped below a defined threshold. The first wireless communication device compares the metric to the threshold and, once the threshold is crossed, detects the failure of the first beam.

At block 1130, the first wireless communication device determines that the first beam is associated with the first beam recovery group of a plurality of beam recovery groups. For instance, the first wireless communication device may save to its memory an indication of which beams correspond to which beam recovery groups. Upon detecting a failure, the first wireless communication device may then compare the failed beam to the data saved in the memory to match the beam to a beam recovery group.

At action 1140, the first wireless communication device transmits a beam failure recovery signal to the second wireless communication device based on the determination that the first beam is associated with the first beam recovery group. In one example, the first beam recovery group includes a partial beam recovery group, and in response, the first wireless communication device determines to perform partial beam recovery by replacing the failed beam with a new beam. Accordingly, the first wireless communication device may transmit the beam failure recovery signal as a partial beam failure recovery request using the second beam. For instance, the partial beam recovery request may include a beam switching request sent via PUCCH or other dedicated uplink.

At action 1150, the first wireless communication device may then communicate the communication signals to the second wireless communication device at least in part using a third beam. In other words, the first wireless communication device and the second wireless communication device continue to communicate, though the set of beams has lost the failed beam and has added a third beam to replace the failed beam. In some examples, the third beam may include a narrow beam or a wide beam. In some instances, the failed beam includes a narrow beam, and it is replaced by another narrow beam, or a failed wide beam may be replaced by another wide beam. Some implementations may even include replacing a failed narrow beam with a wide beam or vice versa.

In another example, the UE had, instead, determined that the failed beam belonged to a second beam recovery group, which is a non-partial beam recovery group. The UE then checks whether other beams in the RS set are active. If other beams in the RS set are active, then the UE does not intervene. In other words, the UE may perform no beam recovery in some instance based at least in part on determining that the failed beam belonged to a non-partial beam recovery group. Also, whether the first beam belongs to a partial beam recovery group or a non-partial beam recovery group, if its failure leaves no active beams in the RS set, then the UE may transmit a beam failure recovery signal that includes a beam failure recovery request (BFRQ) via PRACH on a third beam, such as a selected candidate beam.

Also, the scope of implementations is not limited to action performed by a UE, as methods within the scope of implementations may include actions performed by the BS. In one example, the BS sends an RS set to the UE, and information included with the RS set may indicate beam characteristics (e.g., narrow or wide or other characteristic) or may explicitly indicate a beam grouping (e.g., partial beam recovery group, non-partial beam recovery group). The UE may then either determine the beam recovery groups from the characteristics or simply receive and save indications of the beam recovery groups received from the BS.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, the method comprising:
   communicating, by a first wireless communication device with a second wireless communication device, communication signals using a first beam;
   detecting a failure of the first beam;
   in response to the failure of the first beam, determining that the first beam is associated with a first beam recovery group of a plurality of beam recovery groups, wherein each of the beam recovery groups of the plurality of beam recovery groups is associated with a different beam recovery technique;
   transmitting a beam failure recovery signal to the second wireless communication device based on determining that the first beam is associated with the first beam recovery group; and
   communicating, by the first wireless communication device with the second wireless communication device, the communication signals at least in part using a second beam.

2. The method of claim 1, wherein the beam failure recovery signal is sent via an uplink channel dedicated to the first wireless communication device.

3. The method of claim 1, wherein the beam failure recovery signal is sent via a Physical Uplink Control Channel (PUCCH).

4. The method of claim 1, wherein the first beam and a third beam are both associated with the first beam recovery group, and the third beam is active.

5. The method of claim 1, wherein the beam failure recovery signal comprises a partial beam recovery request sent using the second beam.

6. The method of claim 1, wherein the first beam recovery group is associated with a narrower beam characteristic than is associated with a second beam recovery group.

7. The method of claim 1, further comprising:
   receiving a reference signal set from the second wireless communication device, the reference signal set including information associating the first beam with the first beam recovery group.

8. The method of claim 1, further comprising:
   receiving a reference signal set from the second wireless communication device, the reference signal set including instructions to measure a first characteristic of the first beam and a second characteristic of the second beam; and
   associating the first beam with the first beam recovery group and associating the second beam with a second beam recovery group based on the instructions to measure the first characteristic and the second characteristic.

9. The method of claim 8, wherein the first characteristic includes an item selected from a list consisting of channel state information (CSI) and a synchronization signal block (SSB).

10. The method of claim 1, further comprising:
    receiving a reference signal set from the second wireless communication device, the reference signal set including information associating the first beam with a first beam characteristic; and
    associating the first beam with the first beam recovery group based on the first beam characteristic.

11. The method of claim 10, wherein the first beam characteristic comprises beam width.

12. The method of claim 1, wherein the first beam and the second beam have a smaller beam width and a higher gain than a third beam.

13. The method of claim 1, further comprising:
    detecting a failure of all beams of a reference signal set;
    monitoring a beam identification set to find a third beam as a candidate beam; and
    transmitting a beam failure recovery request to the second wireless communication device.

14. An apparatus comprising:
    a transceiver configured to:
       communicate, to a first wireless communication device, communication signals using a first beam; and
    a processor configured to:
       detect a failure of the first beam;
       determine that the first beam is associated with a first beam recovery group of a plurality of beam recovery groups, in response to the failure of the first beam, wherein each of the beam recovery groups of the plurality of beam recovery groups is associated with a different beam recovery technique;
       cause the transceiver to transmit a beam failure recovery signal to the first wireless communication device based on determining that the first beam is associated with the first beam recovery group; and
       cause the transceiver to communicate, with the first wireless communication device, the communication signals at least in part using a second beam.

15. The apparatus of claim 14, wherein the transceiver is further configured to send the beam failure recovery signal via an uplink channel dedicated to the apparatus.

16. The apparatus of claim 14, wherein the beam failure recovery signal comprises a partial beam recovery request sent using the second beam, and wherein the first beam recovery group is associated with a narrower beam characteristic than is associated with a second beam recovery group.

17. The apparatus of claim 14, wherein the processor is further configured to:
    detect a failure of all beams of a reference signal set, the apparatus further configured to monitor a beam identification set to find a third beam as a candidate beam and to transmit a beam failure recovery request to the first wireless communication device.

18. The apparatus of claim 14, wherein the transceiver is further configured to:
    receive a reference signal set from the first wireless communication device, the reference signal set including information associating the first beam with the first beam recovery group.

19. The apparatus of claim 14, wherein the processor is further configured to:
    process a reference signal set from the first wireless communication device, the reference signal set including instructions to measure a first characteristic of the first beam and a second characteristic of the second beam; and associate the first beam with the first beam recovery group and associate the second beam with a second beam recovery group based on the instructions to measure the first characteristic and the second characteristic.

20. The apparatus of claim 19, wherein the first characteristic includes an item selected from a list consisting of channel state information (CSI) and a synchronization signal block (SSB).

21. An apparatus comprising:
a transceiver configured to:
communicate, by a first wireless communication device with a second wireless communication device, communication signals using a first beam associated with a reference signal set; and
a processor configured to:
detect a failure of the first beam;
determine that the first beam is associated with a first beam recovery group of a plurality of beam recovery groups, wherein each of the beam recovery groups of the plurality of beam recovery groups is associated with a different beam recovery technique; and
determine to not transmit a beam failure recovery signal based on the first beam being associated with the first beam recovery group and based on a second beam being active in the reference signal set.

22. The apparatus of claim 21, comprising a base station.

23. The apparatus of claim 21, wherein the first beam recovery group is associated with a wider beam characteristic than is associated with a second beam recovery group.

24. The apparatus of claim 21, wherein the transceiver is further configured to:
receive the reference signal set from the second wireless communication device, the reference signal set including information associating the first beam with the first beam recovery group.

25. The apparatus of claim 21, wherein the transceiver is further configured to:
receive the reference signal set from the second wireless communication device, the reference signal set including instructions to measure a first characteristic of the first beam and a second characteristic of the second beam; and
associate the first beam with the first beam recovery group and the second beam with a second beam recovery group based on the instructions to measure the first characteristic and the second characteristic.

26. The apparatus of claim 25, wherein the first characteristic comprises beam width.

27. The apparatus of claim 21, wherein the first beam has a larger beam width and a lower gain than the second beam.

28. The apparatus of claim 21, wherein the processor is further configured to:
detect a failure of all beams of the reference signal set; and
transmit a beam failure recovery request to the second wireless communication device.

29. An apparatus comprising:
a transceiver configured to:
transmit a reference signal set from a base station to a user equipment, the reference signal set including information associating a first beam with a first beam recovery group and associating a second beam with a second beam recovery group, wherein the first beam recovery group is associated with a partial beam recovery technique that is different than a beam failure detection and beam failure recovery (BFD/BFR) technique that is associated with the second beam recovery group; and
a processor configured to:
generate the reference signal set and send the reference signal set to the transceiver.

30. The apparatus of claim 29, wherein the information associating the first beam with the first beam recovery group comprises information associating the first beam with a first beam width characteristic.

* * * * *